(12) United States Patent
Schofield et al.

(10) Patent No.: US 7,283,747 B2
(45) Date of Patent: Oct. 16, 2007

(54) OPTICAL SWITCH ROUTER

(75) Inventors: Bruce A. Schofield, Tyngsboro, MA (US); James V. Luciani, Acton, MA (US); Michael J. Craren, Holliston, MA (US)

(73) Assignee: Nortel Networks Limited (CA)

( * ) Notice: Subject to any disclaimer, the term of this patent is extended or adjusted under 35 U.S.C. 154(b) by 25 days.

(21) Appl. No.: 09/931,643

(22) Filed: Aug. 15, 2001
(Under 37 CFR 1.47)

(65) Prior Publication Data
US 2007/0025731 A1 Feb. 1, 2007

Related U.S. Application Data

(60) Provisional application No. 60/225,594, filed on Aug. 15, 2000.

(51) Int. Cl.
*H04J 14/00* (2006.01)
(52) U.S. Cl. .......................... 398/57; 398/51
(58) Field of Classification Search .............. 398/48, 398/49, 50, 66, 51, 54, 55, 56, 57
See application file for complete search history.

(56) References Cited

U.S. PATENT DOCUMENTS

| | | | |
|---|---|---|---|
| 5,488,500 A | 1/1996 | Glance | |
| 5,566,014 A | 10/1996 | Glance | |
| 5,612,805 A | 3/1997 | Fevrier et al. | |
| 5,889,600 A | 3/1999 | McGuire | |
| 5,953,141 A | 9/1999 | Liu et al. | |
| 5,986,783 A | 11/1999 | Sharma et al. | |
| 6,005,697 A | 12/1999 | Wu et al. | |
| 6,285,810 B1 | 9/2001 | Fincato et al. | |
| 6,647,208 B1 * | 11/2003 | Kirby | 398/45 |
| 2002/0030864 A1* | 3/2002 | Chaudhuri et al. | 359/110 |

FOREIGN PATENT DOCUMENTS

EP 0 909 058 B1 11/2005

OTHER PUBLICATIONS

"Simple Wavelength Assignment Protocol", Stephen Suryaputra, et al., Oct. 26, 1999.
"Work on the Automatic Switched Optical Network", Contribution to T1 Standards Project—T1X1.5, Newsome, et. al., Jan. 2000.

(Continued)

*Primary Examiner*—Christina Leung
(74) *Attorney, Agent, or Firm*—McGuinness & Manaras LLP

(57) ABSTRACT

An optical switch router performs both optical switching and traditional routing. The optical switch router includes optical interfaces for coupling to one or more incoming optical fibers and to one or more outgoing optical fibers, and also includes a number of traditional router ports. Individual incoming optical data streams received over the incoming optical fiber(s) can be selectively passed through to one or more of the outgoing optical fibers or "dropped" from the optical communication path for traditional routing. Routed traffic, which can be received over the router ports or from the "dropped" optical data streams, can be forwarded over optical data streams that are "added" to the outgoing optical fiber(s). The "added" optical data streams may be added to the outgoing optical fiber(s) at any unused wavelengths, including, but not limited to, the wavelengths of the "dropped" optical data streams.

49 Claims, 10 Drawing Sheets

OTHER PUBLICATIONS

Memo: "MPLS Control Plane for Switched Optical Networks", MPLS Working Group Internet Draft, Krishnaswamy, et, al., Feb. 2000.

Memo: "IP Over Optical Networks: A Summary of Issues" Internet Draft, N. Chandhok, et al., Jul. 2000.

"Architecture for the Automatic Switched Optical Network" First Draft of G.ason, Mayer, Sep. 13, 2000-Sep. 15, 2000.

"Controlling Optical Data Networks with an Application Specific routing Protocol", Cisco Systems, Inc., 2000.

Memo: "Generalized MPLS—Signaling Functional Description" Ashwood- Smith, Network Working Group Internet Draft, Jul. 2001.

"ASON—Requirements at the Client API", Newsome, et. al., Sep. 2000.

"Automatically Switched Optical Networks (ASON)", Nortel Networks Limited, Jun. 2000.

"MLPS: A Progress Report", Peter Ashwood-Smith, et al., Nov. 1, 1999, URL: http://www.networkmagazine.com/article/NMG20000426S0015.

IPER for PCT/US01/25520, Nortel Networks Ltd.

Introduction to Routing, David M. Psicitello, Dellcore and A. Lyman Chapin, BBN, Open Systems Networking: TCP/IP and OSI, Addison-Wesley Publishers 1993.

OSPF Version 2, IETF RFC 1247, J. Moy, Jul. 1991.

Michael Mayer, First Draft of G.ason "Architecture for the Automatic Switched Optical Network" (ASON), Standards Project: Digital Optical Hierachy. Mar. 2000, pp. 1-14.

Tsaoussidis, et al. "Network Management and Operations: Application Oriented Management in Distributed Environments", IEEE, 1998, pp. 130-134.

Zibman, et al. "An Architectural Approach to Minimizing Feature Interactions in Telecommunications", IBEB/ACM Transactions of Networking, vol. 4, No. 4, Aug. 1996, pp. 582-596.

Wei, et al, "Network Conrol and Management of a Reconfigurable WDM Network", IEEE 1996, pp. 581-586.

Strand, "Optical Layer Services Framework", Optical Internetworking Forum, 1998, pp. 1-10.

* cited by examiner

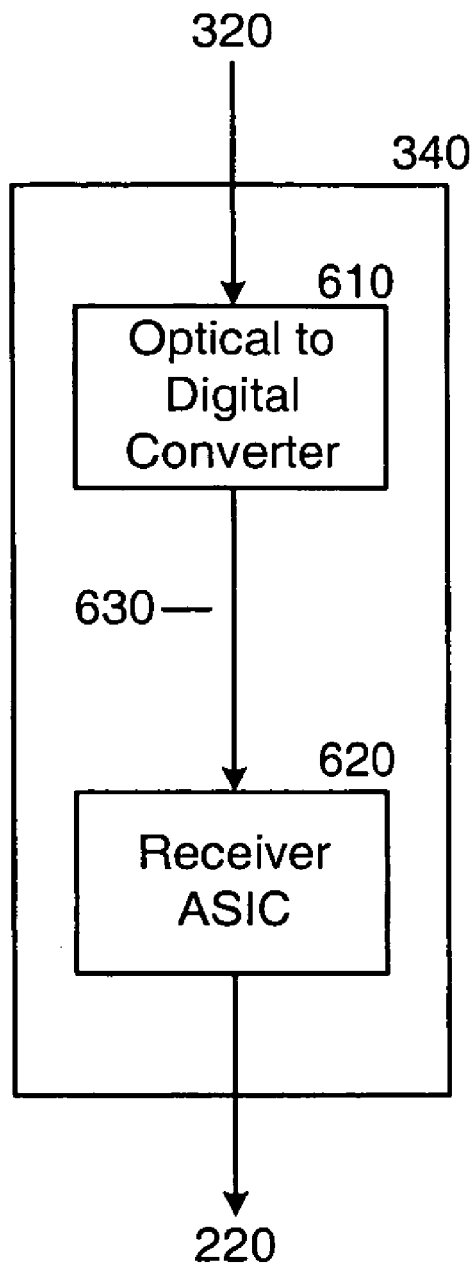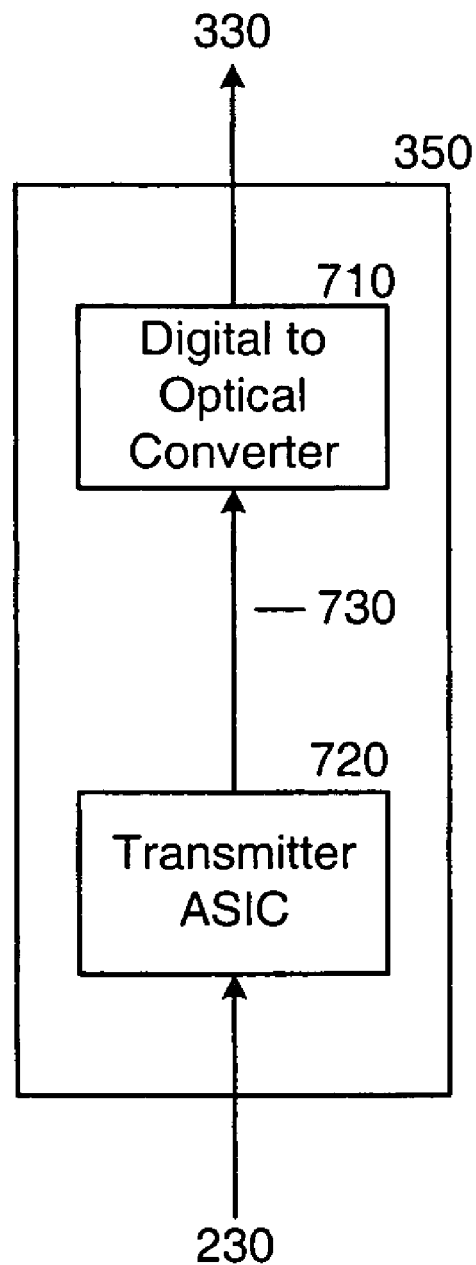
FIG. 6
FIG. 7

FIG. 8    710

OPTICAL SWITCH ROUTER

PRIORITY

The present application claims priority from the following commonly-owned United States patent application, which is hereby incorporated herein by reference in its entirety:

U.S. Provisional Patent Application No. 60/225,594 entitled OPTICAL INTERNET PROTOCOL SWITCH ROUTER, which was filed on Aug. 15, 2000 in the names of Bruce A. Schofield, James V. Luciani, and Michael J. Craren.

CROSS-REFERENCE TO RELATED APPLICATION(S)

The present application may be related to the following commonly-owned United States patent applications, which are hereby incorporated herein by reference in their entireties:

U.S. patent application Ser. No. 09/740,705 entitled SYSTEM, DEVICE, AND METHOD FOR PRODUCING OPTICAL DATA STREAMS IN AN OPTICAL COMMUNICATION NETWORK, which was filed on Dec. 19, 2000 in the name of Bruce A. Schofield;

U.S. patent application Ser. No. 09/740,706 entitled SYSTEM, DEVICE, AND METHOD FOR DROPPING AND ADDING OPTICAL DATA STREAMS IN AN OPTICAL COMMUNICATION NETWORK, which was filed on Dec. 19, 2000 in the name of Bruce A. Schofield; and U.S. patent application Ser. No. 09/740,705 entitled SYSTEM AND DEVICE FOR PROVIDING COMMUNICATION SERVICES IN AN OPTICAL COMMUNICATION SYSTEM, which was filed on even date herewith in the names of Bruce A. Schofield, Indermohan S. Monga, and Stephen Suryaputra.

FIELD OF THE INVENTION

The present invention relates generally to optical networking, and more particularly to an optical switch router.

BACKGROUND OF THE INVENTION

Optical communication facilities provide vast amounts of bandwidth for extremely high-speed communications. In an optical communication system, an optical fiber typically carries multiple optical data streams, with each optical data stream at a different wavelength. This is typically referred to as Wavelength Division Multiplexing (WDM).

Unfortunately, devices that communicate over optical communication facilities are often unable to process information and otherwise operate at the extremely high speeds of the optical communication facilities. Therefore, optical communication signals are typically converted into electronic signals for processing by the devices, and are converted back into optical signals when necessary for transmitting the signals over the optical communication facilities. Such optical-to-electronic and electronic-to-optical signal conversions add substantial delay to communication paths and also add complexity to the devices.

SUMMARY OF THE INVENTION

In accordance with one aspect of the invention, an optical switch router performs both optical switching and traditional routing. The optical switch router includes optical interfaces for coupling to one or more incoming optical fibers and to one or more outgoing optical fibers, and also includes a number of traditional router ports. Individual incoming optical data streams received over the incoming optical fiber(s) can be selectively passed through to one or more of the outgoing optical fibers or "dropped" from the optical communication path for traditional routing. Routed traffic, which can be received over the router ports or from the "dropped" optical data streams, can be forwarded over optical data streams that are "added" to the outgoing optical fiber(s). The "added" optical data streams may be added to the outgoing optical fiber(s) at any unused wavelengths, including, but not limited to, the wavelengths of the "dropped" optical data streams.

One advantage of such an optical switch router over a traditional router is that the optical switch router does not perform optical-electrical-optical conversions in order to pass an optical data stream through from an incoming optical fiber to an outgoing optical fiber. Instead, the optical data stream is passed through unchanged in optical form. This essentially eliminates any processing by the optical switch router for optical data streams that are passed through.

Another advantage of such an optical switch router over a traditional router is that the optical switch router can automatically and dynamically switch between passing through an incoming optical data stream and dropping the incoming optical data stream for local processing by the optical switch router. Thus, the optical switch router can pass through an optical data stream during one period of time and drop the optical data stream for local processing during another period of time. The optical switch router only needs to convert an optical data stream from optical form into electrical form during that period that the optical data stream is being dropped for local processing by the optical switch router.

Other aspects and advantages of the present invention will become apparent from the following disclosure.

BRIEF DESCRIPTION OF THE DRAWINGS

In the accompanying drawings:

FIG. 6 is a block diagram showing relevant components of an optical receiver in accordance with an embodiment of the present invention;

FIG. 7 is a block diagram showing relevant components of an optical transmitter in accordance with an embodiment of the present invention;

DETAILED DESCRIPTION OF A PREFERRED EMBODIMENT

In an embodiment of the invention, an optical switch router performs both optical switching and traditional routing. The optical switch router includes optical interfaces for coupling to one or more incoming optical fibers and to one or more outgoing optical fibers, and also includes a number of traditional router ports. Individual incoming optical data streams received over the incoming optical fiber(s) can be selectively passed through to one or more of the outgoing optical fibers or "dropped" from the optical communication path for traditional routing. Routed traffic, which can be received over the router ports or from the "dropped" optical data streams, can be forwarded over optical data streams that are "added" to the outgoing optical fiber(s). The "added" optical data streams may be added to the outgoing optical fiber(s) at any unused wavelengths, including, but not limited to, the wavelengths of the "dropped" optical data streams.

Figure 1:
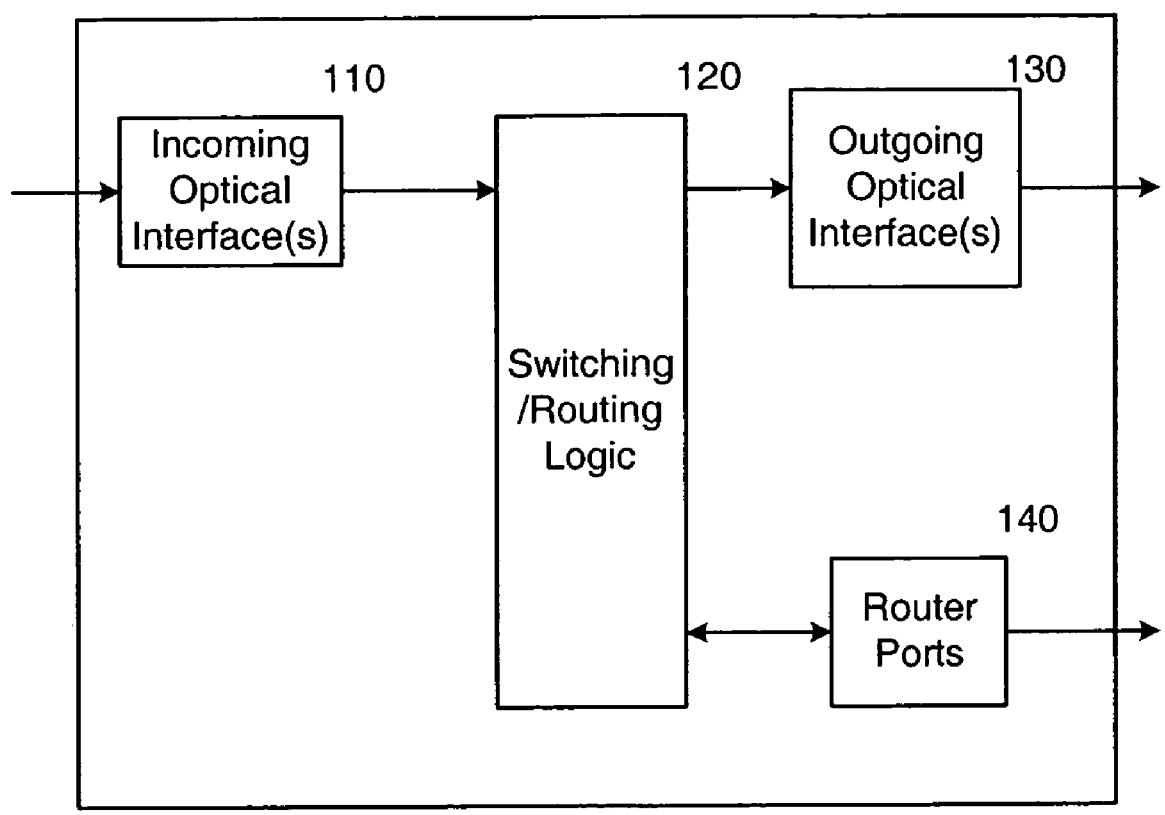
FIG. 1 is a block diagram showing relevant components of an optical switch router in accordance with an embodiment of the present invention.

FIG. 1 shows a representation of an optical switch router 100 in accordance with an embodiment of the present invention. Among other things, the optical switch router 100 includes one or more incoming optical interface(s) 110, switching/routing logic 120, one or more outgoing optical interface(s) 130, and a number of router ports 140. The optical switch router 100 is couplable to one or more incoming optical fibers via the incoming optical interface(s) 110 for receiving optical data streams at various wavelengths. The optical switch router 100 is also couplable to one or more outgoing optical fibers via the outgoing optical interface(s) 130 for outputting optical data streams at various wavelengths. The switching/routing logic 120 is coupled between the incoming optical interface(s) 110 and the outgoing optical interface(s) 130, and is also coupled to the router ports 140. The switching/routing logic 120 includes optical switching logic as well as traditional routing logic. For each individual incoming optical data stream received via the incoming optical interface(s) 110, the switching/routing logic 120 can be dynamically configured to either pass the incoming optical data stream through to the outgoing optical fiber(s) via the outgoing optical interface(s) 130 or "drop" the incoming optical data stream from the optical communication path for traditional routing. The switching/routing logic 120 obtains routable information, such as Internet Protocol (IP) packets, from the "dropped" optical data stream(s) as well as from the router ports 140, and forwards the routable information using traditional routing techniques. The switching/routing logic 120 can forward the routed information over the router ports 140 and/or over one or more optical data streams "added" to the outgoing optical fiber(s) via the outgoing optical interface(s) 130. The "added" optical data stream(s) may be added to the outgoing optical fiber(s) at any unused wavelength(s), including, but not limited to, the wavelength(s) of the "dropped" optical data stream(s).

Figure 2:
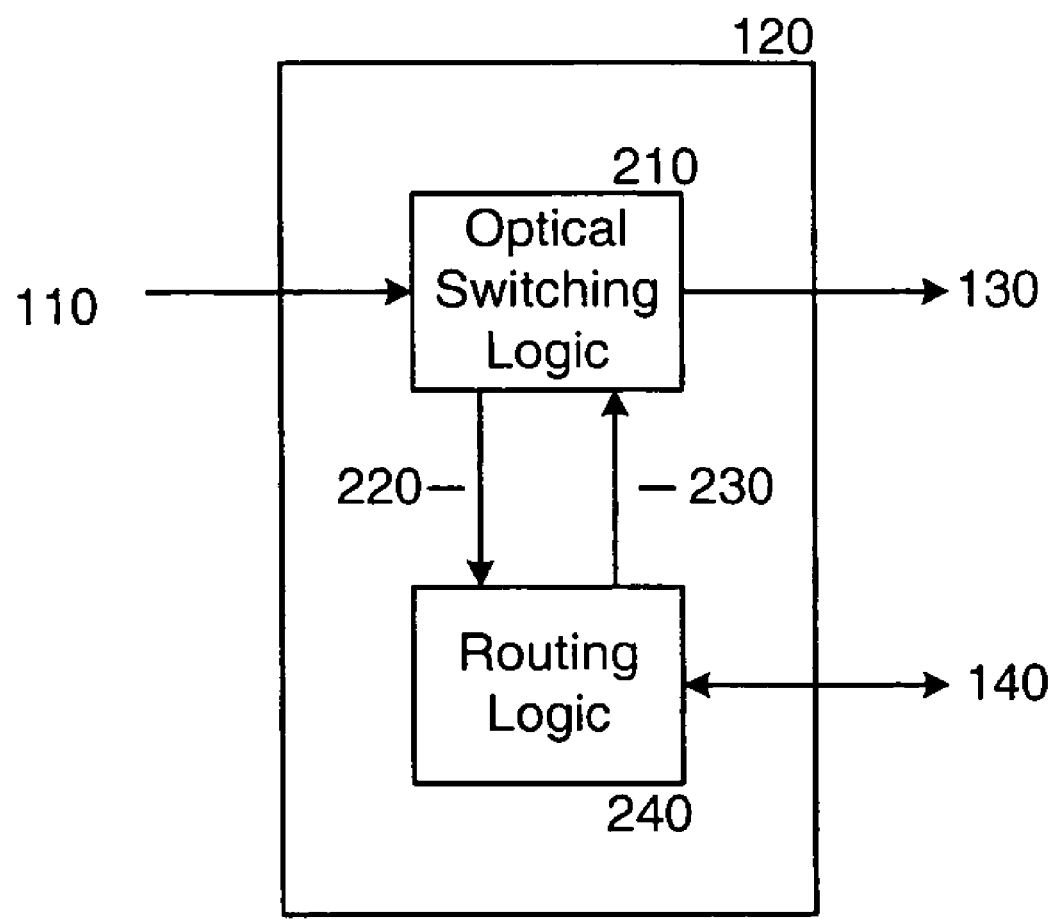
FIG. 2 is a block diagram showing relevant components of the switching/routing logic of the optical switch router in accordance with an embodiment of the present invention.

FIG. 2 shows a representation of the switching/routing logic 120 in accordance with an embodiment of the present invention. Among other things, the switching/routing logic 120 includes optical switching logic 210 and routing logic 240. The optical switching logic 210 is coupled between the incoming optical interface(s) 110 and the outgoing optical interface(s) 130. For each individual incoming optical data stream received via the incoming optical interface(s) 110, the optical switching logic 210 can be dynamically configured to either pass the incoming optical data stream through to the outgoing optical fiber(s) via the outgoing optical interface(s) 130 or "drop" the incoming optical data stream to the routing logic 240 over the interface 220. The routing logic 240 obtains routable information, such as IP packets, from the "dropped" optical data stream(s) received from the optical switching logic 210 over the interface 220 as well as from the router ports 140, and forwards the routable information using traditional routing techniques. The routing logic 240 can forward the routed information over the router ports 140 and/or to the optical switching logic 210 over the interface 230 for transmission by the optical switching logic 210 over one or more optical data streams "added" to the outgoing optical fiber(s) via the outgoing optical interface(s) 130. The "added" optical data stream(s) may be added to the outgoing optical fiber(s) at any unused wavelength(s), including, but not limited to, the wavelength(s) of the "dropped" optical data stream(s).

Optical switching (i.e., dropping and/or adding optical data streams) can be done for any of a variety of reasons. For example, a particular optical data stream may be "dropped" for processing by the routing logic 240 in order to implement multicasting, in which case the incoming optical data stream is terminated by the optical switching logic 210 and multicast traffic is routed by the routing logic 240 according to a predetermined multicast routing mechanism (e.g., PIM). The present invention is in no way limited by the reason for optical switching.

Dynamic configuration of the optical switching logic 210 can be done for any of a variety of reasons. For example, the optical switching logic 210 may be dynamically configured based upon network conditions (e.g., route changes caused by node/link failures, traffic volume, congestion), cost concerns, application requirements, or other end-user requirements, to name but a few. The present invention is in no way limited by the reason for dynamic configuration of the optical switching logic 210.

Dynamic configuration of the optical switching logic 210 can be accomplished using any of a variety of mechanisms. For one example, the optical switching logic 210 may be dynamically configured under control of the routing logic 240, particularly as network routes change pursuant to a routing protocol, such as Routing Information Protocol (RIP) or Open Shortest Path First (OSPF). For another example, the optical switching logic 210 may be dynamically configured under control of a management agent (not shown). The present invention is in no way limited by the mechanism by which dynamic configuration of the optical switching logic 210 is accomplished.

In a typical embodiment of the present invention, the optical switching logic 210 includes a number of optical add/drop multiplexers (OADM). Each OADM is typically coupled to one of the incoming optical interface(s) 110 for processing incoming optical data streams received over a single incoming optical fiber and to one of the outgoing optical interface(s) 130 for outputting optical data streams over a single outgoing optical fiber. In order to process the incoming optical data streams received over the single incoming optical fiber, the OADM typically demultiplexes the incoming optical data streams from the incoming optical fiber. The OADM is configured to pass through certain of the incoming optical data streams to the outgoing optical fiber and to "drop" one or more of the incoming optical data streams from the optical communication path for traditional routing. Each "dropped" optical data stream is sent to an optical receiver, which converts the optical data stream into a digital format and forwards the digital information to the routing logic 240. The optical switching logic 210 receives a number of digital data streams from the routing logic 240 for forwarding as outgoing optical data streams over one or more outgoing optical fibers. Each digital data stream received from the routing logic 240 is processed by an optical transmitter, which converts the forwarded information from a digital format into an optical data stream at a predetermined wavelength and forwards the optical data stream to one of the OADMs. The OADM "adds" the optical data stream to the outgoing optical fiber.

Figure 3:
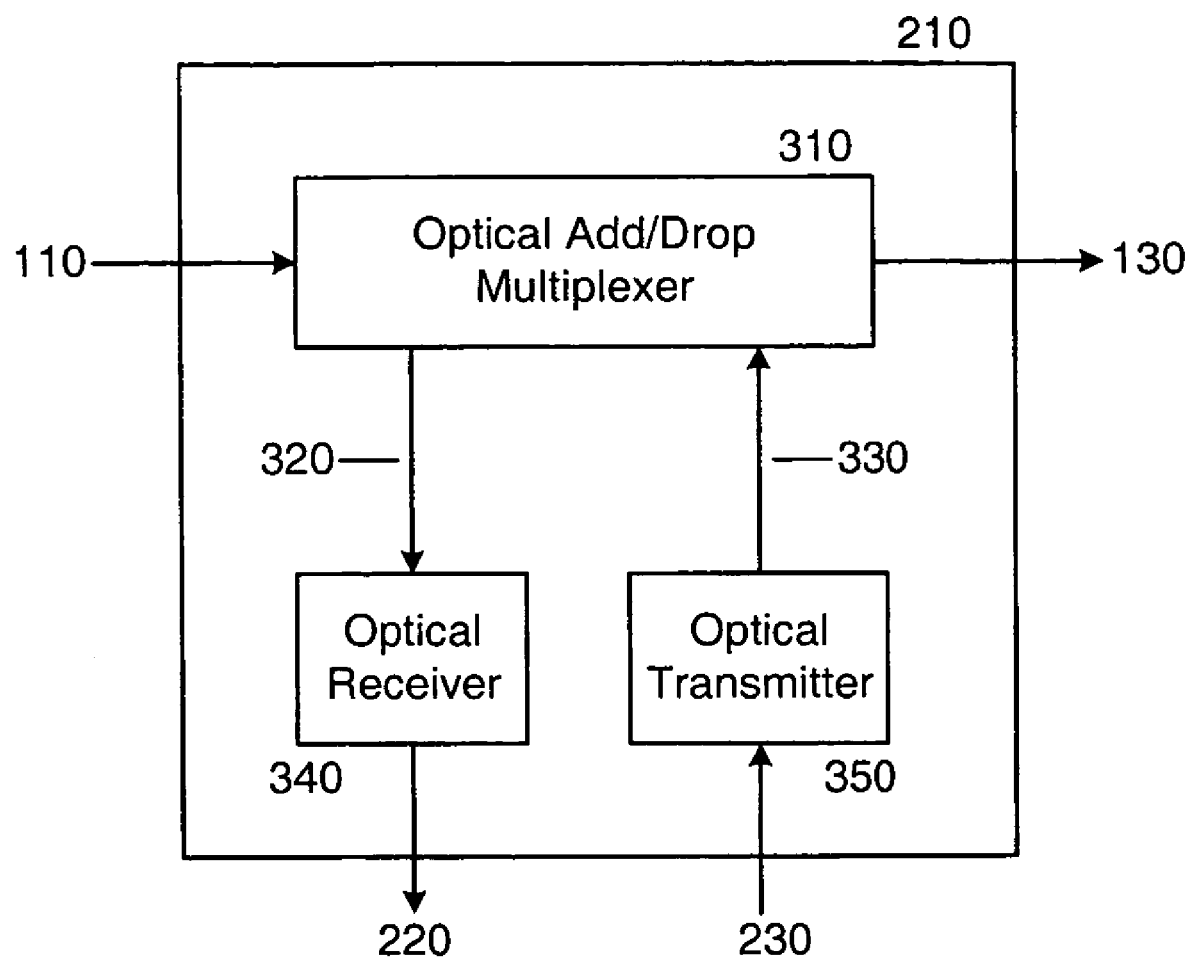
FIG. 3 is a block diagram showing relevant components of the optical switching logic of the switching/routing logic of the optical switch router in accordance with an embodiment of the present invention.

FIG. 3 shows a representation of the optical switching logic 210 in accordance with an embodiment of the present invention. For the sake of simplicity, FIG. 3 shows an embodiment of optical switching logic 210 having one OADM 310, one optical receiver 340, and one optical transmitter 350. It should be noted, however, that in various alternative embodiments of the present invention, the optical switching logic 210 may (and typically does) include multiple OADMs, multiple optical receivers, and multiple optical transmitters.

As shown in FIG. 3, the OADM 310 is coupled to one of the incoming optical interface(s) 110 for processing incoming optical data streams received over a single incoming optical fiber and to one of the outgoing optical interface(s) 130 for outputting optical data streams over a single outgoing optical fiber. The OADM 310 demultiplexes a number of incoming optical data streams from the incoming optical fiber. For each individual incoming optical data stream, the OADM 310 can be configured to either pass the incoming optical data stream through to the outgoing optical fiber via the outgoing optical interface 130 or "drop" the incoming optical data stream to the optical receiver 340 over the interface 320. The optical receiver 340, which acts as a termination point for a "dropped" optical data stream, converts the "dropped" optical data stream into a digital format and forwards the converted optical data stream to the routing logic 240 over the interface 220. The optical transmitter 350 receives forwarded information from the routing logic 240 over the interface 230. The optical transmitter 350 converts the forwarded information from a digital format into an optical data stream at a predetermined wavelength and forwards the optical data stream to the OADM 310 over the interface 330. The OADM 310 "adds" the optical data stream to the outgoing optical fiber via the outgoing optical interface 130.

The OADM 310 can use any of a number of technologies for dropping and adding optical data streams. A typical OADM 310 includes at least a demultiplexer for demultiplexing the incoming optical data streams from the incoming optical fiber, some means for dropping one or more optical data streams, and some means for adding one or more optical data streams. Various embodiments of an OADM 310 are described in the related application entitled SYSTEM, DEVICE, AND METHOD FOR DROPPING AND ADDING OPTICAL DATA STREAMS IN AN OPTICAL COMMUNICATION NETWORK, which was incorporated by reference above. Two exemplary embodiments of an OADM 310 are described below with reference to FIGS. 4-5. It should be noted, however, that the present invention is in no way limited by the technology for dropping and adding optical data streams by the OADM 310.

Figure 4:
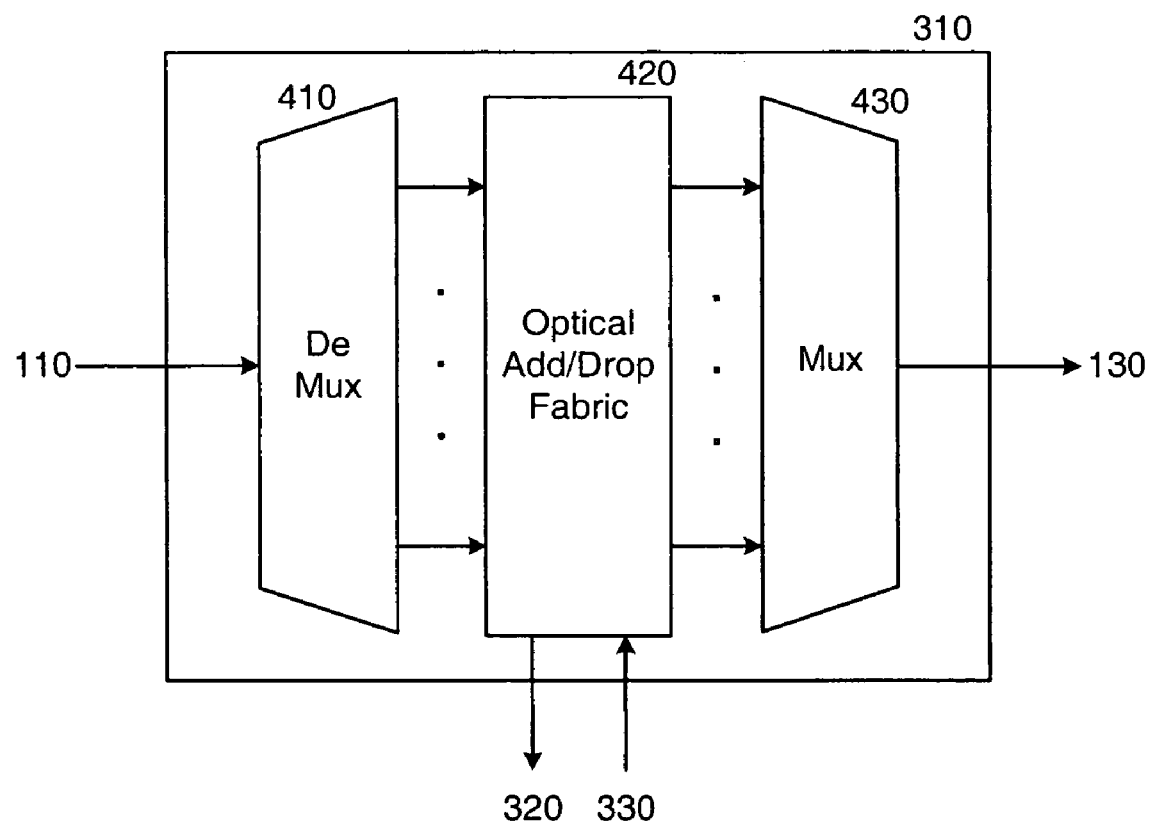
FIG. 4 is a block diagram showing an optical add/drop multiplexer that includes an optical add/drop fabric in accordance with an embodiment of the present invention.

FIG. 4 shows an embodiment of an OADM 310 that includes a demultiplexer 410, an optical add/drop fabric 420, and a multiplexer 430. The demultiplexer 410 is coupled to the incoming optical interface 110 for processing incoming optical data streams received over the incoming optical fiber 110. The demultiplexer 410 demultiplexes a number of incoming optical data streams from the incoming optical fiber 110, and outputs the demultiplexed optical data streams to the optical add/drop fabric 420.

The optical add/drop fabric 420 receives optical data streams from the demultiplexer 410 and also receives any "added" optical data streams from the interface 330. For each optical data stream received from the demultiplexer 410, the optical add/drop fabric 420 can be configured to either pass the optical data stream through to the multiplexer 430 or "drop" the incoming optical data stream to the optical receiver 340 over the interface 320. The optical add/drop fabric 420 can also be configured to output the "added" optical data streams to the multiplexer 430. Due to the operation of the optical add/drop fabric 420, the "added" optical data streams are typically limited to the wavelengths of the "dropped" optical data streams.

The multiplexer 430 receives optical data streams of different wavelengths from the optical add/drop fabric 420. The multiplexer 430 combines the various optical data streams onto a single optical fiber over the outgoing optical interface 130.

In a typical embodiment of the present invention, the optical add/drop fabric 420 is a Micro Electro Mechanical System (MEMS) that includes double-sided mirrors or double mirror combinations for selectively passing, dropping, and adding optical data streams at various wavelengths. However, the present invention is in no way limited to a MEMS. Rather, the optical add/drop fabric 420 can use any of a variety of technologies, including, but not limited to, Micro Electro Mechanical System (MEMS) technology, Micro Opto Electro Mechanical System (MOEMS) technology, bubble (champagne) technology, lithium niobate technology, liquid crystal technology, or other optical/photonic switching technology.

Figure 5:
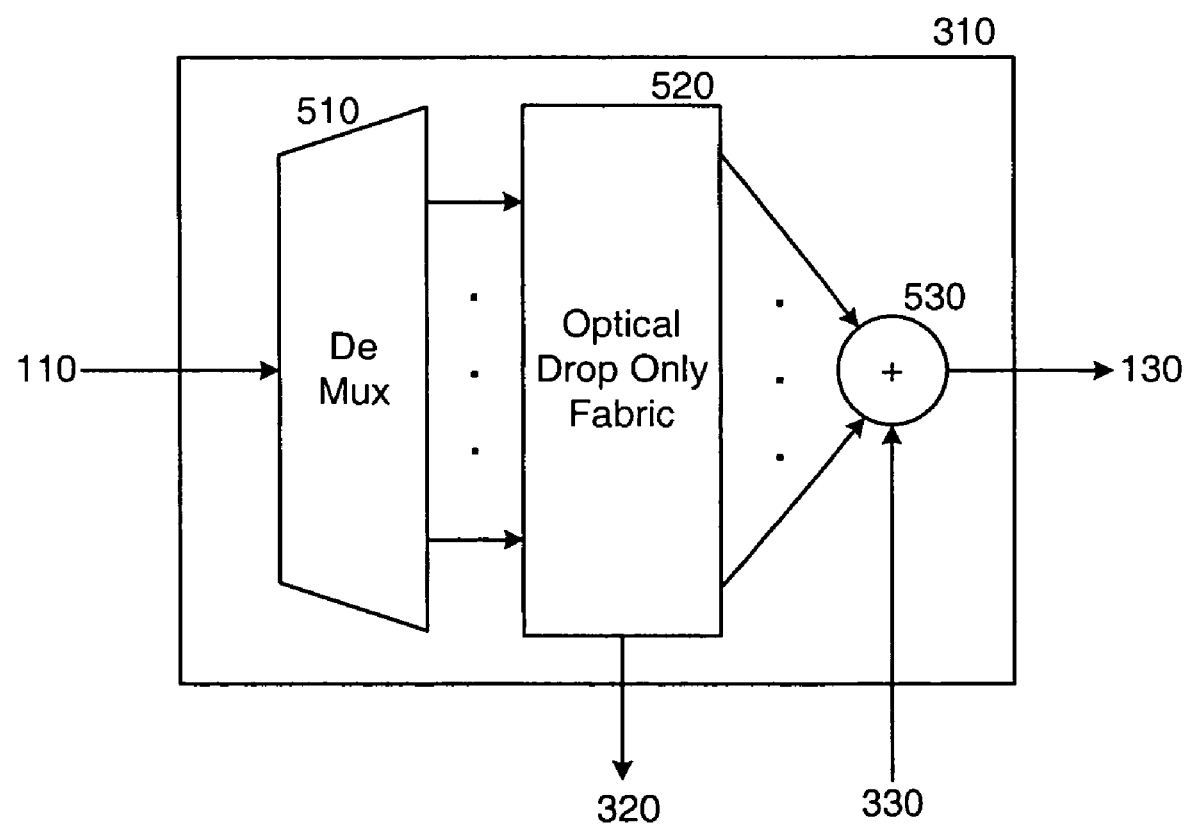
FIG. 5 is a block diagram showing an optical add/drop multiplexer that include an optical drop-only fabric with external combiner in accordance with an embodiment of the present invention.

FIG. 5 shows an embodiment of an OADM 310 that includes a demultiplexer 510, an optical drop-only fabric 520, and an external combiner 530. The demultiplexer 510 is coupled to the incoming optical interface 110 for processing incoming optical data streams received over the incoming optical fiber 110. The demultiplexer 510 demultiplexes a number of incoming optical data streams from the incoming optical fiber 110, and outputs the demultiplexed optical data streams to the optical drop-only fabric 520.

The optical drop-only fabric 520 receives optical data streams from the demultiplexer 510. For each optical data stream received from the demultiplexer 510, the optical drop-only fabric 520 can be configured to either pass the optical data stream through to the external combiner 530 or "drop" the incoming optical data stream to the optical receiver 340 over the interface 320.

The external combiner 530 receives optical data streams from the optical drop-only fabric 520 and also receives any "added" optical data streams from the interface 330. The external combiner 530 combines the various optical data streams onto a single outgoing optical fiber over the outgoing optical interface 130. Because the "added" optical data streams are added to the optical communication path outside of the optical drop-only fabric 520, the "added" optical data streams are typically not limited to the wavelengths of the "dropped" optical data streams.

In a typical embodiment of the present invention, the optical drop-only fabric 520 is a Micro Electro Mechanical System (MEMS) that includes single-sided mirrors for selectively passing and dropping optical data streams at various wavelengths. However, the present invention is in no way limited to a MEMS. Rather, the optical add/drop fabric 420 can use any of a variety of technologies, including, but not limited to, Micro Electro Mechanical System (MEMS) technology, Micro Opto Electro Mechanical System (MOEMS) technology, bubble (champagne) technology, lithium niobate technology, liquid crystal technology, or other optical/photonic switching technology.

With reference again to FIG. 3, the optical receiver 340 is coupled to receive a "dropped" optical data stream at a particular wavelength from the OADM 310 over the interface 320. The optical receiver 340 acts as a termination point for the "dropped" optical data stream. The optical receiver 340 converts the "dropped" optical data stream into a digital format and forwards the converted optical data stream to the routing logic 240 over the interface 220.

FIG. 6 shows a representation of the optical receiver 340. Among other things, the optical receiver 340 includes an optical-to-digital converter 610 and a receiver ASIC (Application Specific Integrated Circuit) 620. The optical-to-digital converter 610 converts the "dropped" optical data stream into a digital data stream and forwards the digital data stream to the receiver ASIC 620 over the interface 630. The receiver ASIC includes logic for receiving the digital data stream over the interface 630, processing the digital data stream, and forwarding the processed digital data stream to the routing logic 240 over the interface 220.

With reference again to FIG. 3, the optical transmitter 350 is coupled to the interface 230 for receiving forwarded information from the routing logic 240. The optical transmitter 350 converts the forwarded information received from the routing logic 240 over the interface 230 from a digital format into an optical data stream at a predetermined wavelength and forwards the optical data stream to the OADM 310 over the interface 330.

FIG. 7 shows a representation of the optical transmitter 350. Among other things, the optical transmitter 350 includes a digital-to-optical converter 710 and a transmitter ASIC (Application Specific Integrated Circuit) 720. The transmitter ASIC 720 includes logic for processing the forwarded information received from the routing logic 240 over the interface 230 and forwarding the processed information to the digital-to-optical converter 710 over the interface 730. The digital-to-optical converter 710 receives the forwarded information over the interface 730, converts the forwarded information from a digital format into an optical data stream at a predetermined wavelength, and forwards the optical data stream to the OADM 310 over the interface 330.

The digital-to-optical converter 710 can use any of a variety of technologies for producing the optical data stream at the predetermined wavelength. A typical digital-to-optical converter 710 includes a laser for producing an optical carrier at the predetermined wavelength and an external modulator for modulating the optical carrier based upon the digital information. Various embodiments for producing a optical data stream at a predetermined wavelength are described in the related application entitled SYSTEM, DEVICE, AND METHOD FOR PRODUCING OPTICAL DATA STREAMS IN AN OPTICAL COMMUNICATION NETWORK, which was incorporated by reference above. Three exemplary embodiments of a digital-to-optical converter 710 are described below with reference to FIGS. 8-10. It should be noted, however, that the present invention is in no way limited by the way in which optical data streams are produced by the optical transmitter 350.

Figure 8:
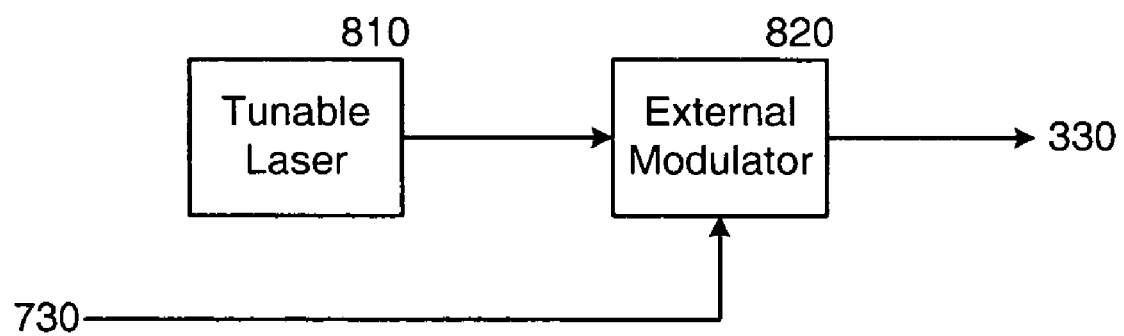
FIG. 8 is a block diagram showing a digital-to-optical converter that employs a tunable (agile) laser to produce an optical data stream at a predetermined wavelength in accordance with an embodiment of the present invention.

FIG. 8 shows an embodiment of a digital-to-optical converter 710 that employs a tunable (agile) laser to produce the optical data stream at the predetermined wavelength. Among other things, the digital-to-optical converter 710 includes a tunable laser 810 and an external modulator 820. The tunable laser 810 is tunable to any of a number of wavelengths, and is tuned to the predetermined wavelength in order to produce an optical carrier at the predetermined wavelength. The external modulator 820 is coupled to receive the optical carrier from the tunable laser 810 and to receive the forwarded information from the interface 730. The external modulator 820 modulates the optical carrier based upon the forwarded information in order to produce the optical data stream at the predetermined wavelength and forward the optical data stream to the OADM 310 over the interface 330.

Figure 9:
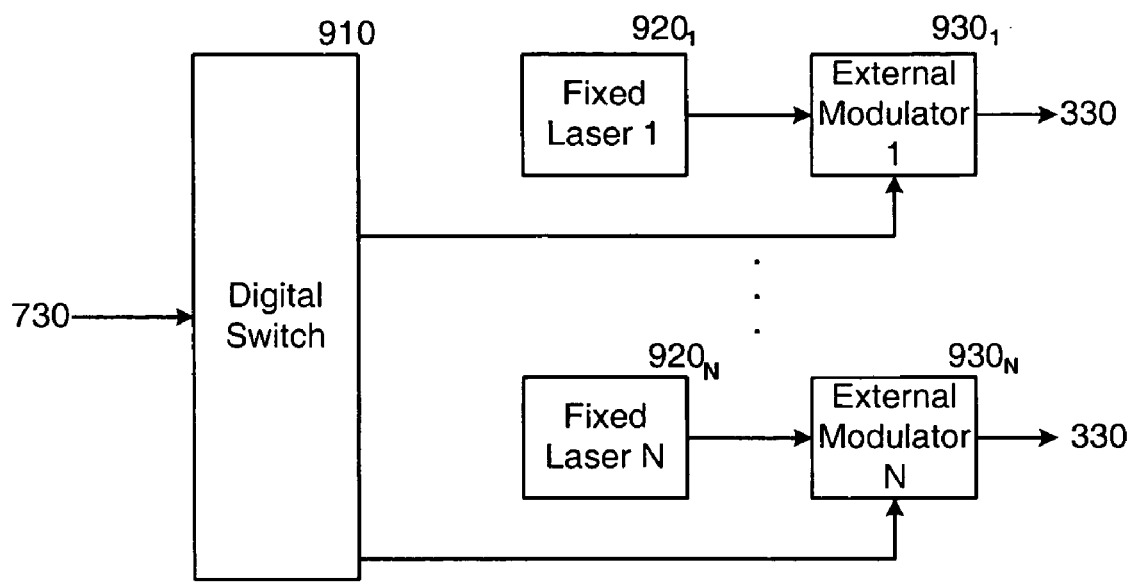
FIG. 9 is a block diagram showing a digital-to-optical converter that employs fixed wavelength lasers and digital switching to produce an optical data stream at a predetermined wavelength in accordance with an embodiment of the present invention.

FIG. 9 shows an embodiment of a digital-to-optical converter 710 that employs fixed wavelength lasers and digital switching to produce the optical data stream at the predetermined wavelength. Among other things, the digital-to-optical converter 710 includes N fixed wavelength lasers $920_1$-$920_N$ coupled respectively to N external modulators $930_1$-$930_N$. Each laser/modulator pair is capable of producing an optical data stream at one and only one wavelength. A digital switch 910 routes the forwarded information from the interface 730 to the external modulator of the laser/modulator pair at the predetermined wavelength. The external modulator modulates the optical carrier based upon the forwarded information in order to produce the optical data stream at the predetermined wavelength and forward the optical data stream to the OADM 310 over the interface 330.

Figure 10:
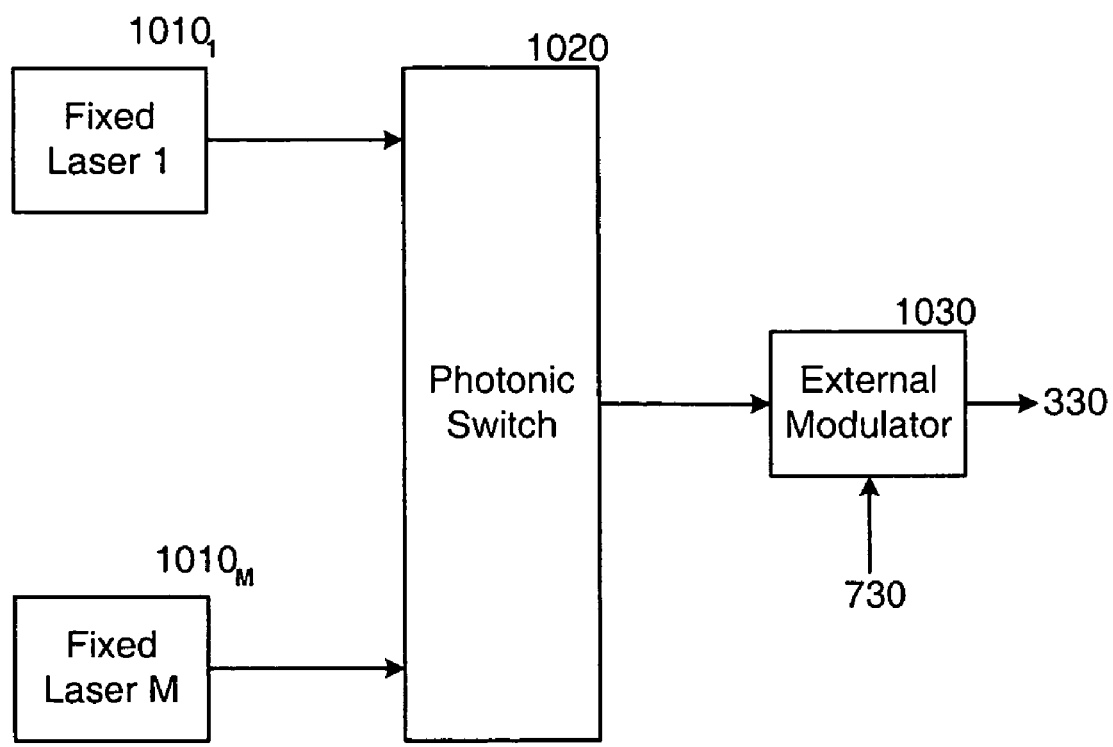
FIG. 10 is a block diagram showing a digital-to-optical converter that employs fixed wavelength lasers and photonic switching to produce an optical data stream at a predetermined wavelength in accordance with an embodiment of the present invention.

FIG. 10 shows an embodiment of a digital-to-optical converter 710 that employs fixed wavelength lasers and photonic switching to produce the optical data stream at the predetermined wavelength. Among other things, the digital-to-optical converter 710 includes M fixed wavelength lasers $1010_1$-$1010_M$ and an external modulator 1030. Each fixed wavelength laser is capable of producing an optical carrier at one and only one wavelength. A photonic switch 1020 routes the optical carrier from the fixed wavelength laser having the predetermined wavelength to the external modulator 1030. The external modulator 1030 modulates the optical carrier based upon the forwarded information received over the interface 730 in order to produce the optical data stream at the predetermined wavelength and forward the optical data stream to the OADM 310 over the interface 330.

In a typical embodiment of the present invention, optical switching logic is implemented as an optical line card that can be installed in a router. Multiple optical line cards may be installed in a router. Each optical line card interfaces with an optical network through an optical physical (PHY) card in the router. The optical PHY card typically includes at least incoming and outgoing optical interfaces for coupling with incoming and outgoing optical fiber(s), respectively.

Figure 11:
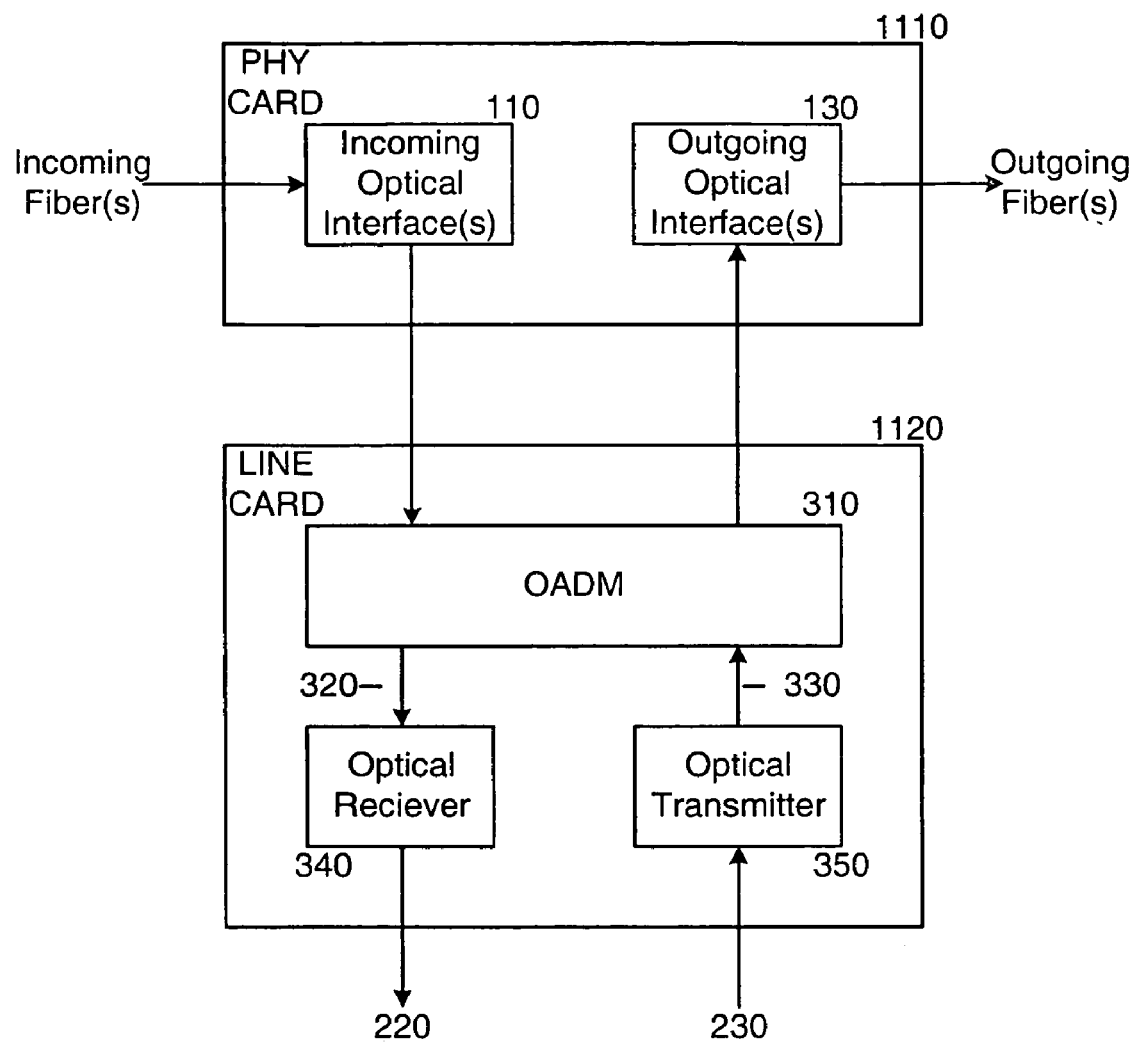
FIG. 11 is a block diagram showing relevant components of an optical PHY card and an optical line card for use in an optical switch router in accordance with an embodiment of the present invention.

FIG. 11 shows representation of an optical PHY card 1110 and an optical line card 1120 for use in an optical switch router. In this example, the optical PHY card 1110 includes, among other things, a number of incoming optical interfaces 110 and a number of outgoing optical interfaces 130 for interfacing the optical line card 1120 to an optical network. The optical line card 1120 includes, among other things, the OADM 310, the optical receiver 340, and the optical transmitter 350.

It should be noted that the optical receiver 340 and the optical transmitter 350 may be placed on the optical PHY card 1110 rather than the optical line card 1120, for example, to make room for additional components on the optical line card 1120. Also, the optical PHY card 1110 may include additional optical interfaces for interfacing to other optical PHY cards and to other optical line cards within the router.

In various embodiments of the invention, the configuration of components on the optical PHY card 1110 and the optical line card 1120 depend on a number of factors including, but not limited to, the size of cards, the type of components (e.g., fixed wavelength lasers versus tunable lasers, digital switches versus photonic switches), the size of the components, the number of fibers supported, the number of optical data streams per fiber, the optical line rate (i.e., the data rate of each optical data stream), the frequency spacing of optical data streams on each fiber, the number of optical data streams that can be dropped and added, and the cost of the components, to name but a few.

Generally speaking, there is a trade-off between performance, cost, and component size. The cost and size of many of the components generally increases with increased wavelength density (i.e., number of optical data streams on an optical fiber), increased optical line rates, and decreased wavelength spacing (i.e., spacing between optical data streams on an optical fiber). Likewise, wavelength agility (i.e., the ability to drop and/or add optical data streams at varying wavelengths rather than at fixed, predetermined wavelengths) generally increases the component costs.

Although the present invention is not limited to any particular wavelength density, optical line rate, or wavelength spacing, a convenient and cost-effective optical line card implementation supports two incoming optical fibers and two outgoing optical fibers, each having eight 10 Gb/s optical data streams spaced at 100 GHz. The number of optical data streams that can be dropped by the optical switching logic is typically limited to a maximum of two or four.

Supporting two incoming optical fibers with a wavelength density of eight optical data streams per optical fiber typically provides for a less expensive implementation compared to, for example, a single incoming optical fiber having sixteen optical data streams. This is true even though two OADMs are needed, one for each incoming optical fiber, since, generally speaking, doubling the wavelength density (e.g., from eight to sixteen wavelengths on an optical fiber) typically triples the cost for components such as the optical demultiplexer/multiplexer. There is a small space premium to pay to support two optical fibers of eight wavelengths each rather than a single fiber with sixteen wavelengths. A typical sixteen wavelength multiplexer/demultiplexer is approximately 4"×5", while a typical eight wavelength multiplexer/demultiplexer is approximately 3"×5". In addition, both need room for fiber pigtails to be curled up.

The 10 Gb/s line rate is convenient due to accelerating interest in 10 GbE (Gigabit Ethernet). However, other optical line rates (such as a common line rate of 2.5 Gb/s) can also be supported.

The 100 GHz wavelength spacing typically provides for a less expensive implementation compared to, for example, a wavelength spacing of 50 GHz. The tighter wavelength spacing of 50 GHz is possible but more expensive, since optical mux/demux functions typically increase by a factor of 3 to 4 at 50 Ghz spacing over 100 Ghz spacing while only doubling the capacity of the optical fiber. Additionally, the cost of lasers would increase to meet the tighter wavelength stability requirements of 50 Ghz spacing. So by using 100 Ghz spacing and 10 Gb/s per channel, the aggregate bit rate is increase by a factor of 4 over 2.5 Gb/s while maintaining the lower cost wavelength spacing.

Four exemplary embodiments of the present invention are discussed below. The four exemplary embodiments are all based upon an implementation using two incoming optical fibers with eight 10 Gb/s optical data streams on each optical fiber spaced at 100 GHz, with an additional fiber input that is used in the event of a network/fiber fault on one of the primary fibers. The optical links are presumed to be short haul links. The optical components are presumed to be "pigtail" devices, and the space allowed for these pigtails is equal to the package size (which is an appropriate approximation for the smaller devices, but is an overly conservative approximation for the larger devices such as the optical mux/demux). Estimates of the hardware components, cost, and space requirements (excluding control and interface circuitry) are given for each of the four exemplary embodiments. The cost estimates are based upon the following component cost estimates:

| | |
|---|---:|
| 1 × 8 Optical Demux | $8,000 |
| 8 × 1 Optical Mux | $8,000 |
| 2 × 2 Optical Switch | $300 |
| Fixed Laser + Modulator | $4,000 |
| Agile Laser + Modulator | $8,000 |
| Optical Receiver | $1,000 |

An agile (tunable) laser is presumed to be tunable within one second. Fast tuning typically costs substantially more, and it's added benefit is unclear.

The estimated cost for an optical receiver increases to $2,000 if long haul links are supported.

In a first exemplary embodiment, two optical data streams can be dropped at the optical line card, one from each incoming fiber. The dropped wavelengths are fixed in that they can only be changed by manually disconnecting and reconnecting fibers outside of the demultiplexer and multiplexer. The component, cost, and space estimates for this embodiment are as follows:

| | | |
|---|---|---:|
| (2) 1 × 8 Optical Demux | $16,000 (2) 3" × 5" + pigtails | 60 sq in |
| (2) 8 × 1 Optical Mux | $16,000 (2) 3" × 5" + pigtails | 60 sq in |
| (2) 2 × 2 Optical Switch | $600 (2) 1" × 2" + pigtails | 8 sq in |
| (2) ITU Lasers + Modulator | $8,000 (2) 2" × 2" + pigtail | 16 sq in |
| (2) Optical Receiver | $2,000 (2) 2" × 2" + pigtail | 16 sq in |
| TOTAL: | $42,600 | 160 sq in |

In a second exemplary embodiment, two optical data streams can be dropped at the optical line card, one from each incoming optical fiber. The dropped wavelengths are tunable, for example, under software control. The component, cost, and space estimates for this embodiment are as follows:

| | | |
|---|---|---|
| (2) 1 × 8 Optical Demux | $16,000 (2) 3" × 5" + pigtails | 60 sq in |
| (2) 8 × 1 Optical Mux | $16,000 (2) 3" × 5" + pigtails | 60 sq in |
| (2) 2 × 2 Optical Switch | $600 (2) 1" × 2" + pigtails | 8 sq in |
| (16) 2 × 2 Optical Switch | $4,800 (16) 1" × 2" + pigtails | 64 sq in |
| (2) 1 × 2 Optical coupler | $400 (2) 1" × 2" + pigtails | 8 sq in |
| (2) Agile Lasers + Modulator | $16,000 (2) 2" × 2" + pigtail | 16 sq in |
| (1) Laser Control Circuit | $200 (1) 2" × 3" | 6 sq in |
| (2) Optical Receiver | $2,000 (2) 2" × 2" + pigtail | 16 sq in |
| (8) 8 × 1 Optical Switch | $2,000 (2) 4" × 4" + pigtails | 32 sq in |
| TOTAL: | $58,000 | 270 sq in |

In a third exemplary embodiment, a maximum of four optical data streams can be dropped at the optical line card from either or both of the incoming optical fibers (e.g., three dropped from one fiber, one dropped from the other fiber). The dropped wavelengths are fixed in that they can only be changed by manually disconnecting and reconnecting fibers outside of the demultiplexer and multiplexer. The component, cost, and space estimates for this embodiment are as follows:

| | | |
|---|---|---|
| (2) 1 × 8 Optical Demux | $16,000 (2) 3" × 5" + pigtails | 60 sq in |
| (2) 8 × 1 Optical Mux | $16,000 (2) 3" × 5" + pigtails | 60 sq in |
| (2) 2 × 2 Optical Switch | $600 (2) 1" × 2" + pigtails | 8 sq in |
| (4) ITU Lasers + Modulator | $16,000 (2) 2" × 2" + pigtail | 32 sq in |
| (4) Optical Receiver | $4,000 (2) 2" × 2" + pigtail | 32 sq in |
| TOTAL: | $52,600 | 192 sq in |

In a fourth exemplary embodiment, four optical data streams can be dropped at the optical line card, two from each incoming optical fiber. The dropped wavelengths are tunable, for example, under software control. The component, cost, and space estimates for this embodiment are as follows:

| | | |
|---|---|---|
| (2) 1 × 8 Optical Demux | $16,000 (2) 3" × 5" + pigtails | 60 sq in |
| (2) 8 × 1 Optical Mux | $16,000 (2) 3" × 5" + pigtails | 60 sq in |
| (2) 2 × 2 Optical Switch | $600 (2) 1" × 2" + pigtails | 8 sq in |
| (16) 2 × 2 Optical Switch | $4,800 (16) 1" × 2" + pigtails | 64 sq in |
| (1) 1 × 2 Optical coupler | $200 (1) 1" × 2" + pigtails | 4 sq in |
| (1) 1 × 4 Optical coupler | $200 (1) 1" × 2" + pigtails | 4 sq in |
| (4) Agile Lasers + Modulator | $32,000 (2) 2" × 2" + pigtail | 32 sq in |
| (4) Laser Control Circuit | $200 (2) 2" × 3" | 12 sq in |
| (4) Optical Receiver | $4,000 (2) 2" × 2" + pigtail | 32 sq in |
| (4) 8 × 1 Optical Switch | $4,000 (4) 4" × 4" + pigtail | 64 sq in |
| TOTAL: | $74,000 | 340 sq in |

Based upon these estimates, the increase in cost and size for the optical portion of the line card is not substantial between adding/dropping two wavelengths versus add/dropping four wavelengths. Also, the increase in cost to use agile lasers is not great, but the increase in board space is significant. However, all four exemplary embodiments should be capable of fitting on a single optical line card. Therefore, whether a particular implementation supports a two dropped/added wavelengths or four dropped/added wavelengths and whether the dropped/added wavelengths are fixed or agile depends to a large degree on any additional circuitry/functions that are included on the optical line card. For example, if the termination circuitry for the 10 Gb/s data streams is included on the optical line card, then there will likely only be enough room for components supporting two dropped/added wavelengths. On the other hand, if the termination circuitry is placed elsewhere (for example, on another line card), then there should be enough room for components supporting four agile dropped/added wavelengths.

It should be noted that these component cost and size estimates are used for comparison purposes only. Actual component costs and sizes may be different, and may change. Historically, the costs and sizes of communication system components tend to decrease as the technology curve advances. Such decreases in cost and size may enable certain component configurations to fit on a single optical line card and/or be implemented in a more cost-effective manner. Thus, for example, with lower component costs and sizes, it may be possible to support more optical fibers, higher line rates, closer wavelength spacing, more dropped/added wavelengths, and/or additional circuitry/functions. Thus, the present invention is in no way limited to any particular implementation or implementations due to constraints imposed by component costs or sizes.

It should be noted that, although the exemplary embodiments of the optical switching logic 210 described above include an optical add/drop multiplexer 310 that performs both "drop" and "add" functions, the present invention is in no way limited to an optical add/drop multiplexer that performs both "drop" and "add" functions. The optical switching logic 210 may perform a "drop" only function, an "add" only function, or both "drop" and "add" functions. Thus, various embodiments of the present invention may provide for dropping incoming optical data streams without adding new optical data streams to the outgoing fiber (i.e., "drop" only function), adding new optical data streams to the outgoing fiber without dropping optical data streams from the incoming optical fiber ("add" only function), or dropping and adding optical data streams.

It should be noted that the present invention is not limited to any particular routing mechanism by which the routing logic 240 routes information. In a typical embodiment of the present invention, the routed information consists of IP packets that are routed based upon some routing protocol, such as RIP or OSPF. However, the present invention is not limited to these or to any other protocol(s).

It should be noted that the terms "multiplexer" and "combiner" are used herein for discussing two different embodiments of an optical add/drop multiplexer. Within the context of the present invention, a multiplexer is a combiner, and a combiner is a multiplexer, as both aggregate multiple optical data streams onto a single outgoing optical fiber. The present invention is in no way limited by the use of these terms.

It should be noted that terms such as "switch" and "router" are used herein to describe communication devices and communication functions that may be used in a communication system, and should not be construed to limit the present invention to any particular communication device type. Thus, a communication device may include, without limitation, a bridge, router, bridge-router (brouter), switch, node, or other communication device.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

The present invention may be embodied in other specific forms without departing from the true scope of the invention. The described embodiments are to be considered in all respects only as illustrative and not restrictive.

What is claimed is:

1. A network device comprising:
   optical switching logic coupled between a plurality of input optical interfaces and a plurality of output optical interfaces, for selectively forwarding an optical data stream having a given wavelength to either one of the optical interfaces for output on at least one optical fiber or to routing logic, the optical data stream comprising a plurality of packets; and
   wherein the routing logic is operably coupled to the switching logic to selectively receive the optical data stream from the optical switching logic and retrieve routing information from the optical data stream, wherein the routing information is used to dynamically control the forwarding of subsequent optical data streams transmitted at the given wavelength through the optical switch logic to one of the output optical interfaces on the at least one optical fiber for performing open shortest path first (OSPF) forwarding.

2. The networking device of claim 1, wherein the optical switching logic is operably coupled to receive an incoming optical data stream from an incoming optical fiber over an incoming optical interface and selectively pass the incoming optical data stream through to an outgoing optical fiber over an outgoing optical interface or divert the incoming optical data stream for processing by the routing logic.

3. The networking device of claim 2, wherein the optical switching logic comprises a demultiplexer operably coupled to demultiplex the incoming optical data stream from a number of incoming optical data streams received from the incoming optical fiber over the incoming optical interface.

4. The networking device of claim 3, wherein the optical switching logic further comprises an optical switch operably coupled to receive the incoming optical data stream from the demultiplexer and to selectively pass the incoming optical data stream through to the outgoing optical fiber over the outgoing optical interface or divert the incoming optical data stream for processing by the routing logic.

5. The networking device of claim 4, wherein the optical switching logic further comprises an optical receiver operably coupled to receive the diverted incoming optical data stream from the optical switch and convert the diverted incoming optical data stream into incoming digitally formatted information for processing by the routing logic.

6. The networking device of claim 5, wherein the routing logic is operably coupled to receive the incoming digitally formatted information from the optical receiver and route the incoming digitally formatted information based upon a routing mechanism.

7. The networking device of claim 3, wherein the optical switch comprises an optical add/drop fabric.

8. The networking device of claim 3, wherein the optical switch comprises an optical drop-only fabric.

9. The networking device of claim 1, wherein the routing logic is operably coupled to forward outgoing digitally formatted information to the optical switching logic for forwarding to an outgoing optical fiber over an outgoing optical interface.

10. The networking device of claim 9, wherein the optical switching logic is operably coupled to receive the outgoing digitally formatted information from the routing logic and output an outgoing optical data stream to the outgoing optical fiber over the outgoing optical interface.

11. The networking device of claim 10, wherein the optical switching logic comprises an optical transmitter operably coupled to receive the outgoing digitally formatted information from the routing logic and produce the outgoing optical data stream from the digitally formatted information at a predetermined wavelength.

12. The networking device of claim 11, wherein the optical transmitter comprises a fixed wavelength laser for producing the outgoing optical data stream at the predetermined wavelength.

13. The networking device of claim 11, wherein the optical transmitter comprises a tunable laser tuned to produce the outgoing optical data stream at the predetermined wavelength.

14. The networking device of claim 11, wherein the optical switching logic further comprises:
an optical switch operably coupled to receive the outgoing optical data stream from the optical transmitter; and
a multiplexer operably coupled to receive the outgoing optical data stream from the optical switch and add the outgoing optical data stream to the outgoing optical fiber over the outgoing optical interface.

15. The networking device of claim 14, wherein the optical switch comprises an optical add/drop fabric.

16. The networking device of claim 11, wherein the optical switching logic further comprises a combiner operably coupled to receive the outgoing optical data stream from the optical transmitter and add the outgoing optical data stream to the outgoing optical fiber over the outgoing optical interface.

17. The networking device of claim 1, wherein the networking device is an optical switch router.

18. A system comprising at least two network devices, each network device including:
optical switching logic coupled between a plurality of input optical interfaces and a plurality of output optical interfaces, for selectively forwarding an optical data stream having a given wavelength to either one of the optical interfaces for output on at least one optical fiber or to routing logic, the optical data stream comprising a plurality of packets; and
whereby the routing logic is operably coupled to the switching logic to selectively receive the optical data stream having the given wavelength from the optical switching logic and retrieve routing information from the optical data stream, wherein the routing information is used to dynamically control the forwarding of subsequent optical data streams transmitted at the given wavelength through the optical switch logic to one of the output optical interfaces on the at least one optical fiber for performing Open Shortest Path First (OSPF forwarding.

19. The system of claim 18, wherein the optical switching logic is operably coupled to receive an incoming optical data stream from an incoming optical fiber over an incoming optical interface and selectively pass the incoming optical data stream through to an outgoing optical fiber over an outgoing optical interface or diver the incoming optical data stream for processing by the routing logic.

20. The system of claim 19, wherein the optical switching logic comprises a demultiplexer operably coupled to demultiplex the incoming optical data stream from a number of incoming optical data streams received from the incoming optical fiber over the incoming optical interface.

21. The system of claim 20, wherein the optical switching logic further comprises an optical switch operably coupled to receive the incoming optical data stream from the demultiplexer and to selectively pass the incoming optical data stream through to the outgoing optical fiber over the outgoing optical interface or divert the incoming optical data stream for processing by the routing logic.

22. The system of claim 21, wherein the optical switching logic further comprises an optical receiver operably coupled to receive the diverted incoming optical data stream from the optical switch and convert the diverted incoming optical data stream into incoming digitally formatted information for processing by the routing logic.

23. The system of claim 22, wherein the routing logic is operably coupled to receive the incoming digitally formatted information from the optical receiver and route the incoming digitally formatted information based upon a routing mechanism.

24. The system of claim 20, wherein the optical switch comprises an optical add/drop fabric.

25. The system of claim 20, wherein the optical switch comprises an optical drop-only fabric.

26. The system of claim 18, wherein the routing logic is operably coupled to forward outgoing digitally formatted information to the optical switching logic for forwarding to an outgoing optical fiber over an outgoing optical interface.

27. The system of claim 26, wherein the optical switching logic is operably coupled to receive the outgoing digitally formatted information from the routing logic and output an outgoing optical data stream to the outgoing optical fiber over the outgoing optical interface.

28. The system of claim 27, wherein the optical switching logic comprises an optical transmitter operably coupled to receive the outgoing digitally formatted information from the routing logic and produce the outgoing optical data stream from the digitally formatted information at a predetermined wavelength.

29. The system of claim 28, wherein the optical transmitter comprises a fixed wavelength laser for producing the outgoing optical data stream at the predetermined wavelength.

30. The system of claim 28, wherein the optical transmitter comprises a tunable laser tuned to produce the outgoing optical data stream at the predetermined wavelength.

31. The system of claim 28, wherein the optical switching logic further comprises:
an optical switch operably coupled to receive the outgoing optical data stream from the optical transmitter; and
a multiplexer operably coupled to receiver the outgoing optical data stream from the optical switch and add the outgoing optical data stream to the outgoing optical fiber over the outgoing optical interface.

32. The system of claim 31, wherein the optical switch comprises an optical add/drop fabric.

33. The system of claim 28, wherein the optical switching logic further comprises a combiner operably coupled to receive the outgoing optical data stream from the optical transmitter and add the outgoing optical data stream to the outgoing optical fiber over the outgoing optical interface.

34. The system of claim 18, wherein the system is an optical switching/routing system.

35. An optical line card for use in a networking device, the optical line card comprising:
a router interface; and
optical switching logic operably coupled to receive an incoming optical data stream having a given wavelength from an incoming optical fiber over an incoming optical interface and selectively pass the incoming optical data stream either through to an outgoing optical fiber over an outgoing optical interface or to the router interface for processing by routing logic, wherein the routing logic is operably coupled to the switching logic to selectively receive the optical data stream from the optical switching logic and retrieve routing information from the optical data stream, wherein the routing information is used to dynamically control the forwarding of subsequent incoming optical data streams transmitted at the given wavelength through the optical switch logic to the outgoing optical fiber for performing Open Shortest Path First (OSPF) forwarding.

36. The optical line card of claim 35, wherein the optical switching logic comprises a demultiplexer operably coupled to demultiplex the incoming optical data stream from a number of incoming optical data streams received from the incoming optical fiber over the incoming optical interface.

37. The optical line card of claim 36, wherein the optical switching logic further comprises an optical switch operably coupled to receive the incoming optical data stream from the demultiplexer and to selectively pass the incoming optical data stream through to the outgoing optical fiber over the outgoing optical interface or divert the incoming optical data stream over the router interface for processing by the routing logic.

38. The optical line card of claim 37, wherein the optical switching logic further comprises an optical receiver operably coupled to receive the diverted incoming optical data stream from the optical switch and convert the diverted incoming optical data stream into incoming digitally formatted information for processing by the routing logic.

39. The optical line card of claim 38, wherein the routing logic is operably coupled to receive the incoming digitally formatted information from the optical receiver and route the incoming digitally formatted information based upon a routing mechanism.

40. The optical line card of claim 36, wherein the optical switch comprises an optical add/drop fabric.

41. The optical line card of claim 36, wherein the optical switch comprises an optical drop-only fabric.

42. The optical line card of claim 35, wherein the optical switching logic is operably coupled to receive outgoing digitally formatted information from the routing logic over the router interface and output an outgoing optical data stream to the outgoing optical fiber over the outgoing optical interface.

43. The optical line card of claim 42, wherein the optical switching logic comprises an optical transmitter operably coupled to receive the outgoing digitally formatted information from the routing logic over the router interface and produce the outgoing optical data stream from the digitally formatted information at a predetermined wavelength.

44. The optical line card of claim 43, wherein the optical transmitter comprises a fixed wavelength laser for producing the outgoing optical data stream at the predetermined wavelength.

45. The optical line card of claim 43, wherein the optical transmitter comprises a tunable laser tuned to produce the outgoing optical data stream at the predetermined wavelength.

46. The optical line card of claim 43, wherein the optical switching logic further comprises:
   an optical switch operably coupled to receive the outgoing optical data stream from the optical transmitter; and
   a multiplexer operably coupled to receive the outgoing optical data stream from the optical switch and add the outgoing optical data stream to the outgoing optical fiber over the outgoing optical fiber over the outgoing optical interface.

47. The optical line card of claim 46, wherein the optical switch comprises an optical add/drop fabric.

48. The optical line card of claim 43, wherein the optical switching logic further comprises a combiner operably coupled to receive the outgoing optical data stream from the optical transmitter and add the outgoing optical data stream to the outgoing optical fiber over the outgoing optical interface.

49. The optical line card of claim 35, wherein the incoming optical interface and the outgoing optical interface are on an optical physical card, and wherein the optical line card further comprises a physical card interface for coupling the optical switching logic to the incoming optical interface and the outgoing optical interface.

* * * * *